United States Patent
Schmidtke

(10) Patent No.: US 6,547,855 B1
(45) Date of Patent: Apr. 15, 2003

(54) MASS TRANSFER SYSTEM

(75) Inventor: Troy D. Schmidtke, St. Paul, MN (US)

(73) Assignee: Aeromix Systems, Inc., Golden Valley, MN (US)

( * ) Notice: Subject to any disclaimer, the term of this patent is extended or adjusted under 35 U.S.C. 154(b) by 0 days.

(21) Appl. No.: 09/967,135

(22) Filed: Sep. 28, 2001

Related U.S. Application Data

(62) Division of application No. 09/543,167, filed on Apr. 5, 2000, now Pat. No. 6,355,096.

(51) Int. Cl.[7] .................. B01D 47/02; B01D 19/00
(52) U.S. Cl. .................. 95/149; 95/216; 95/221; 95/226; 95/237; 95/241; 95/245; 95/258; 95/260; 95/262; 95/263; 95/254; 261/121.1; 261/123; 261/124; 261/DIG. 19
(58) Field of Search .................. 95/245, 254, 260, 95/262, 263, 149, 151, 223, 226, 19, 23, 24, 216, 218, 221, 237, 241, 258; 96/155–157, 174, 204, 215, 220, 243, 244, 245, 252, 253, 262, 329, 351–353; 261/122.1, 123, 124, DIG. 19, 121.1; 210/188, 750

(56) References Cited

U.S. PATENT DOCUMENTS

| | | |
|---|---|---|
| 370,016 A | 9/1887 | Hyatt |
| 1,049,796 A | 1/1913 | Anderson |
| 2,484,277 A | 10/1949 | Fisher |
| 2,718,275 A | 9/1955 | Banks |
| 3,353,336 A | 11/1967 | Caballero |
| 3,679,053 A | 7/1972 | Koulovatos et al. |
| 3,799,512 A | 3/1974 | Raybon |
| 3,856,487 A | 12/1974 | Perez |
| 3,920,419 A * | 11/1975 | Schroeder et al. ............ 95/263 |
| 3,993,448 A | 11/1976 | Lowery, Sr. |
| 4,338,103 A | 7/1982 | Fuller ............................ 55/259 |
| 4,608,163 A | 8/1986 | Yohe et al. .................. 210/150 |
| 4,816,044 A * | 3/1989 | Weisert et al. ................. 96/157 |
| 4,869,832 A * | 9/1989 | Lamarre ....................... 95/263 |
| 4,872,955 A | 10/1989 | Parker et al. ................ 202/154 |
| 4,906,338 A | 3/1990 | DeLoach ....................... 203/10 |
| 5,045,215 A * | 9/1991 | Lamarre ....................... 95/263 |
| 5,340,383 A * | 8/1994 | Womack ....................... 95/263 |
| 5,352,276 A * | 10/1994 | Rentschler et al. ............ 95/263 |
| 5,387,349 A * | 2/1995 | Trotter et al. ................ 210/750 |
| 5,478,507 A | 12/1995 | Bros ......................... 361/114.1 |
| 5,518,668 A * | 5/1996 | Chresand et al. ............. 261/113 |
| 5,685,976 A | 11/1997 | Lamarre ..................... 210/150 |
| 5,690,864 A * | 11/1997 | Tyer ......................... 261/122.1 |
| 5,980,613 A | 11/1999 | Reiber .......................... 95/246 |
| 6,197,162 B1 * | 3/2001 | Quiros ......................... 95/266 |
| 6,251,167 B1 * | 6/2001 | Berson ......................... 95/263 |
| 6,355,096 B1 * | 3/2002 | Schmidtke .................... 96/220 |

* cited by examiner

Primary Examiner—Duane Smith
Assistant Examiner—Jason M. Greene
(74) Attorney, Agent, or Firm—Kinney & Lange, P.A.

(57) ABSTRACT

A mass transfer machine removes dissolved gases or volatile organic compounds from air or a liquid. The mass transfer machine includes a vessel capable of containing a liquid and having a liquid inlet and an air inlet at a near end. It further includes a liquid outlet at a far end. Two or more baffles are located transversely inside of the vessel. The baffle located nearest to the far end of the vessel has a window. Two or more diffusers are located near a bottom surface of the vessel. The diffusers are in communication with the air inlet and have two or more orifices through a wall. An adjustable plate is releasably mounted over the window of the baffle located closest to the far end of the vessel. The plate is adjustable in a vertical direction. In one embodiment, an air source supplies air to the air inlet located on the near end of the vessel. In another embodiment, an air source is connected to the an air exit located on the far side of the vessel.

29 Claims, 4 Drawing Sheets

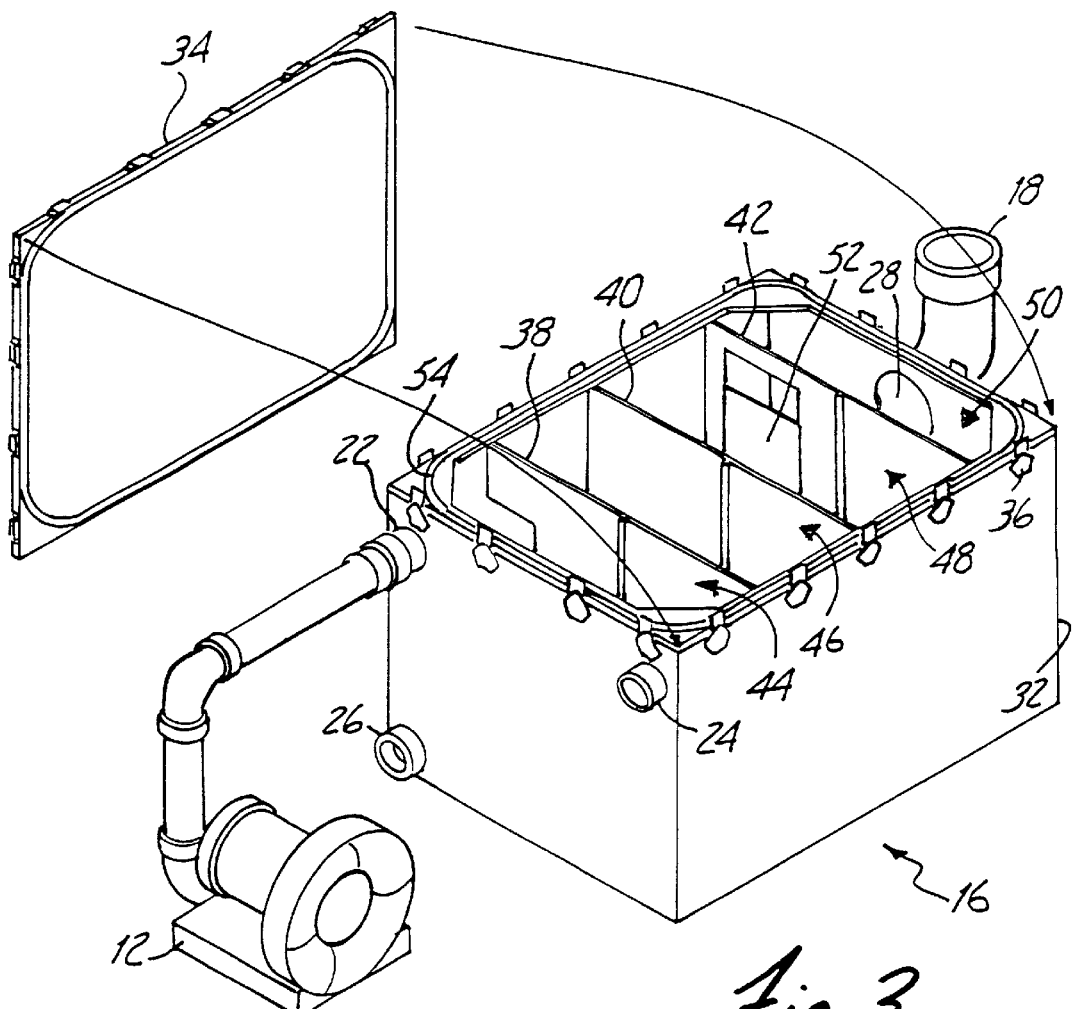

MASS TRANSFER SYSTEM

CROSS-REFERENCE TO RELATED APPLICATION(S)

This application is a divisional of U.S. patent application Ser. No. 09/543,167, filed Apr. 5, 2000 issued as U.S. Pat. No. 6,355,096 B1 on Mar. 12, 2002.

BACKGROUND OF THE INVENTION

The present invention relates to a mass transfer machine for removing moving dissolved gases or volatile organic compounds from a liquid to a gas or from a gas to a liquid. More specifically, the present invention relates to a mass transfer system that provides improved flexibility and efficiency.

A mass transfer machine is capable of moving dissolved gases or volatile organic compounds in either direction. The transfer of mass from a liquid (typically water) to air is commonly referred to as air stripping or degasifying. The transfer of mass from air to a liquid is commonly referred to as scrubbing. The use of mass transfer machines to remove volatile compounds from water is known in the art. A variety of mass transfer machines are known, including air strippers, air scrubbers, and distillation towers. Each of these devices operates under the same basic principle. A gas and a liquid are brought into contact with each other causing dissolved gases or volatile organic compounds to migrate from the liquid to the gas.

Mass transfer machines are useful in numerous situations. Typical applications include removal of radon or $CO_2$ from well water and removing contaminants from water at refueling depots, petro chemical plants, hazardous waste sites, or landfills. It is therefore advantageous that the mass transfer machine be portable and capable of operating on-site. Further, it is important that the mass transfer machine operate as efficiently as possible to minimize power consumption, while at the same time maximizing removal rates. There is a need in the art for a portable, low maintenance, energy efficient, mass transfer machine suitable for on-site operation.

BRIEF SUMMARY OF THE INVENTION

The present invention is a mass transfer machine for transferring dissolved gases or volatile organic compounds between air and a liquid. The mass transfer machine includes a vessel having a liquid inlet and an air inlet at a proximal end. The vessel has a liquid outlet at a distal end. The vessel is capable of containing a liquid. The vessel contains at least two chambers, and the chamber located nearest to the distal end of the vessel has an adjustable height passageway used to control the height of the liquid in the vessel. A diffuser is located near a bottom surface of each chamber of the vessel.

BRIEF DESCRIPTION OF THE DRAWINGS

FIG. 3 is a top perspective view of the mass transfer machine shown in FIG. 2, with the cover removed.

DETAILED DESCRIPTION

Figure 1:
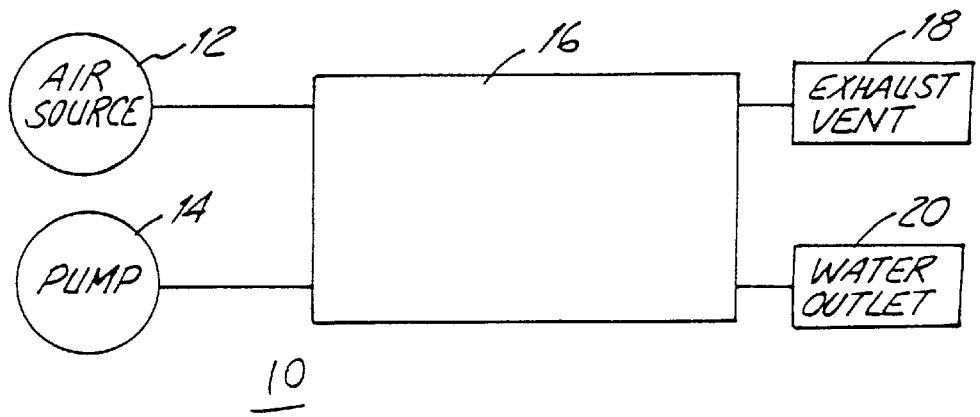
FIG. 1 is a schematic view of the mass transfer machine of the present invention.

FIG. 1 shows a schematic view of a mass transfer system 10 for removing contaminants from ground water or waste water. The mass transfer system 10 includes, as shown from left to right in FIG. 1, an air source 12, a pump 14, a mass transfer machine 16, an exhaust vent 18, and a water exit 20. The air source 12 is coupled to an air inlet on the mass transfer machine 16 and the exhaust vent 18 is coupled to an air outlet on the mass transfer machine 16. The pump 14 is connected to a water input, and the water exit 20 is connected to a water outlet on the mass transfer machine 16.

Figure 2:
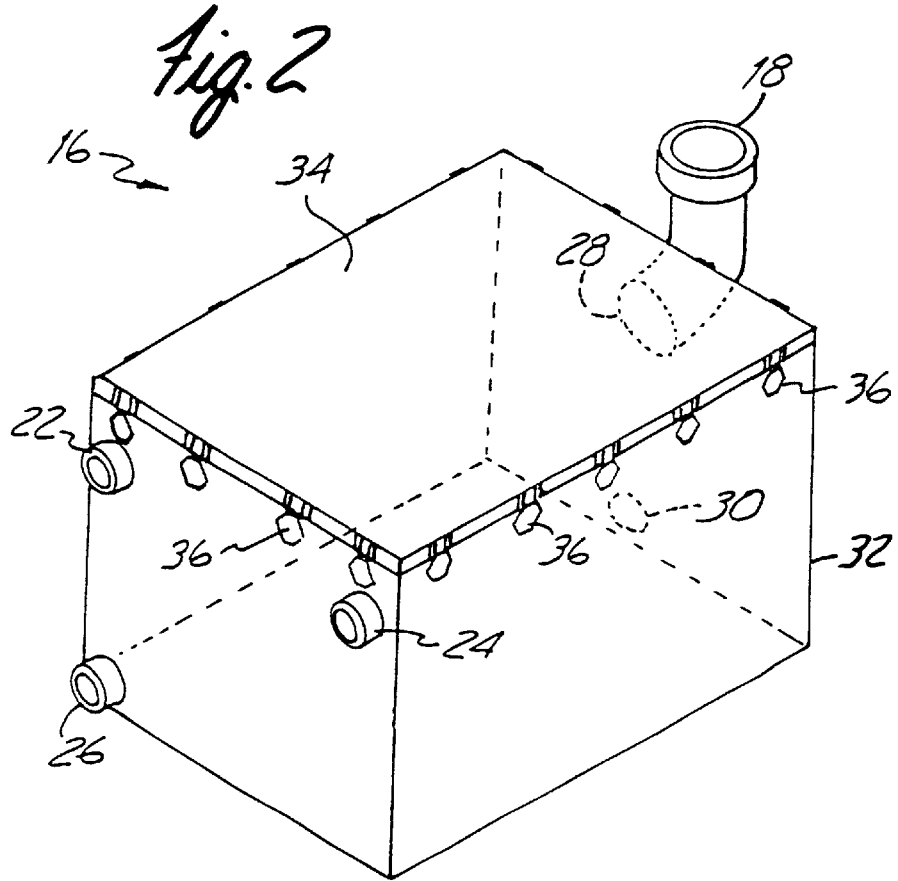
FIG. 2 is a top perspective view of the mass transfer machine of the present invention.

FIG. 2 shows a top perspective view of the mass transfer machine 16. As shown in FIG. 2, the mass transfer machine 16 includes, on its front side, an air inlet 22, a water inlet 24, and a drain 26. The air inlet 22 and water inlet 24 are each located near the top of the front side of the mass transfer machine 16. Each inlet 22, 24 is configured for connection to a supply pipeline. The drain 26 is located near a bottom of the front side of the mass transfer machine 16 and is configured like the inlets 22, 24. As further shown in FIG. 2, the mass transfer machine 16 includes, on its rear face, an air outlet 28 and a water outlet 30. Both outlets 28, 30 are located near a vertical midline. The air outlet 28 is located near the top of the rear face, and the water outlet 30 is located near the bottom of the rear face. The mass transfer machine 16 further includes a body 32 and a cover 34 releasably secured to the body 32 by fasteners 36. In one embodiment, the body 32 and the cover 34 of the mass transfer machine 16 are constructed from polypropylene by a welding technique.

FIG. 3 shows a top perspective view of the mass transfer machine 16 with the cover 34 removed. FIG. 3 also shows the air source 12 and the exhaust vent 18 connected to the mass transfer machine 16. As shown in FIG. 3, the mass transfer machine 16 includes a cover 34, which may be releasably coupled to the body 32 by fasteners 36. As further shown in FIG. 3, located inside the body 32 are a first baffle 38, a second baffle 40, and a final baffle 42, which define a first chamber 44, a second chamber 46, a final chamber 48, and a quiescent chamber 50. The baffles 38, 40, 42 extend laterally across the inside of the body 32 and are disposed generally perpendicular to a longitudinal centerline. As shown in FIG. 3, the first baffle 38 includes an opening 51 located near a left side of the body 32. The opening 51 is positioned on the side of the body 32 opposite the side of the water inlet 24. Each successive baffle, moving from the front to the rear of the body 32, with the exception of the final baffle, includes an opening. The openings are placed on opposite sides of the body 32. This configuration acts to create serpentine flow of the water through the mass transfer machine 16, as described in greater detail below. In one embodiment, the baffles 38, 40, 42 (like the body 32 and the cover 34) are constructed from polypropylene. Depending upon the chemicals present in the system, other materials could also be used including polyethylene and teflon.

The final baffle 42 includes a weir plate 52, which is adjustable to control the depth of water inside the first chamber 44, the second chamber 46, and the final chamber 48. The operation of the weir plate 52 is discussed in greater detail below. In the embodiment shown in FIG. 3, the mass transfer machine 16 includes three chambers, however alternative embodiments of the present invention include a mass transfer machine 16 having four, five, six, seven, eight, nine, or more chambers. The purposes and advantages of having various chamber numbers is discussed in greater detail below. On the top surface of the body 32, a gasket 54 lies in a groove. The gasket 54 acts in conjunction with the cover 34 and the fasteners 36 to create an air-tight seal between the body 32 and the cover 34 of the mass transfer machine 16.

Figure 4A:
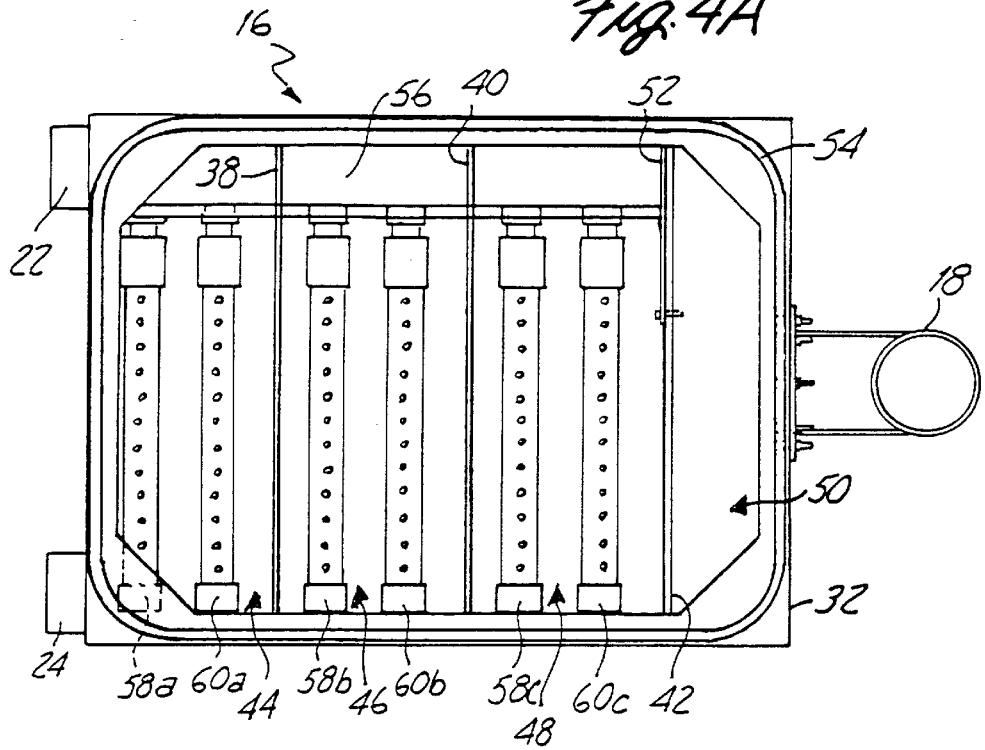
FIG. 4A is a top view of the mass transfer machine shown in FIG. 2, with the cover removed.
Figure 4B:
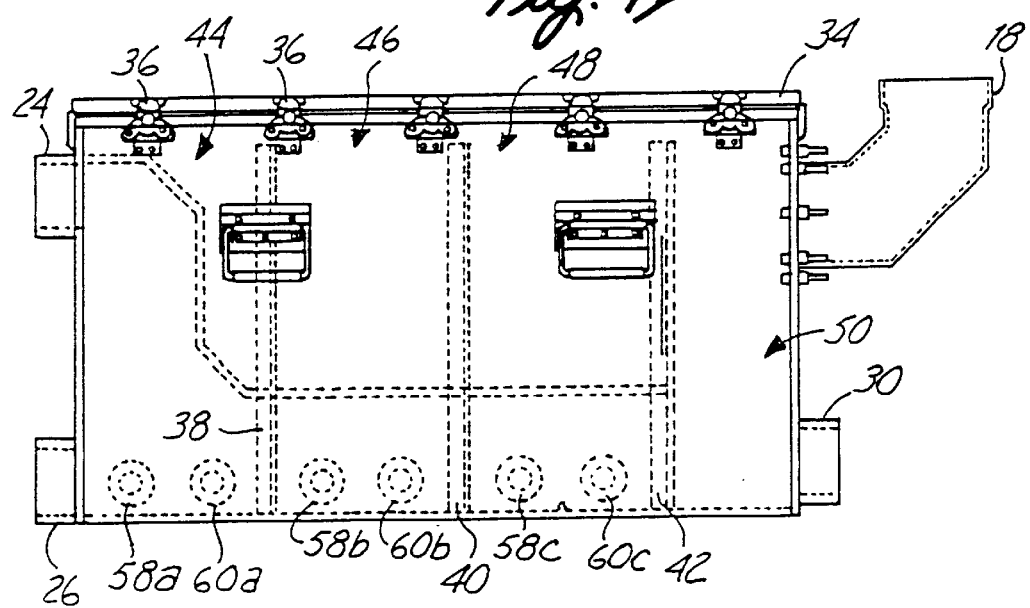
FIG. 4B is a side view of the mass transfer machine shown in FIG. 2.

FIG. 4A shows a top view of the mass transfer machine 16 with the cover 34 removed, and FIG. 4B shows a side view of the mass transfer machine 16. As shown in FIGS. 4A and 4B, the air inlet 22 is in communication with an air manifold 56. The air manifold 56, in turn, is in communication with a first diffuser 58a and a second diffuser 60a located in the first chamber 44. The manifold 56 is also in communication with a first diffuser 58b and a second diffuser 60b located in the second chamber 46. Additionally, the manifold 56 is in communication with a first diffuser 58c and a second diffuser 60c located in the final chamber 48. In the embodiment of the present invention, as illustrated in FIGS. 4A and 4B, each of the chambers 44, 46, 48 includes two diffusers 58, 60. In a first alternative embodiment, each of the chambers 44, 46, 48 includes only one diffuser. In a second alternative embodiment, the chambers 44, 46, 48 include more than two diffusers per chamber.

As shown in FIGS. 4A and 4B, the diffusers 58, 60 are located near a bottom surface of the body 32 and extend substantially along the length of the chambers 44, 46, 48. In the illustrated embodiment, the diffusers 58, 60 are disposed generally parallel to one another and spaced generally equidistant from each other and from the chamber walls. The diffusers 58, 60 are hollow tubes, each having several diffuser orifices 62 extending through the tube wall. In one embodiment, the diffusers 58, 60 are constructed from polypropylene. The diffuser orifices 62 are generally spaced equal distances from one another and located along a straight line. In a first embodiment, the diffuser orifices 62 are located along a line extending along a top surface of the diffusers 58, 60. In alternative embodiments, the diffuser orifices 62 may be located along a line other than that defined by the top surface of the diffusers 58, 60, or the orifices may be located along multiple lines running along the surface of the diffusers 58, 60.

Figure 5:
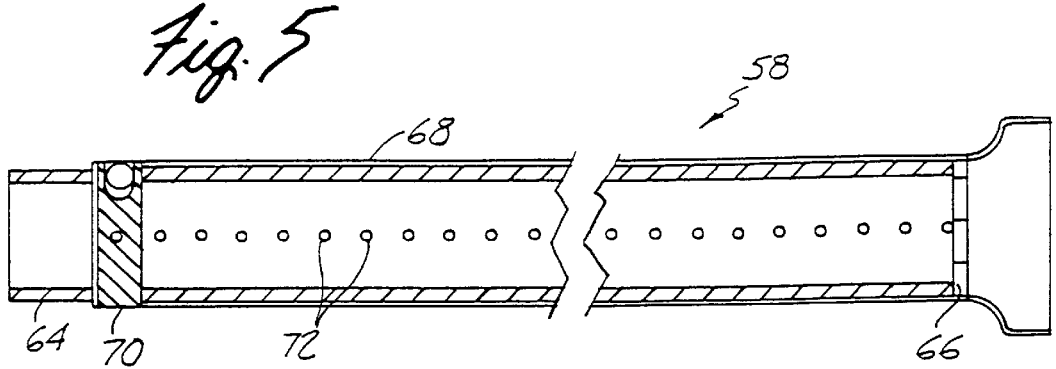
FIG. 5 is a sectional view of an air diffuser for use with the present invention.

The diffusers 58, 60, are shown in greater detail in FIG. 5. The diffuser 58 includes a proximal end 64 and a distal end 66. The diffuser 58, shown in FIG. 5, includes a diffuser sleeve 68 surrounding the external surface of the diffuser 58 and covering the diffuser orifices 62. The diffuser sleeve 68 extends from the distal end 66 to near the proximal end 64 of the diffuser 58. A clamp 70 is used to secure the diffuser sleeve 68 to the diffuser 58 and form an air-tight seal. In one embodiment, the clamp 70 is a stainless steel band clamp. The diffuser 68 includes sleeve orifices 72 extending through a wall of the diffuser sleeve 68. In a first embodiment, the diffuser sleeve 68 is made from a polymeric material. In a second embodiment, the diffuser sleeve 68 is made from EPDM. The sleeve orifices 72 on the diffuser sleeve 68 are of a smaller diameter than the diffuser orifices 62 on the diffuser 58.

Figure 6:
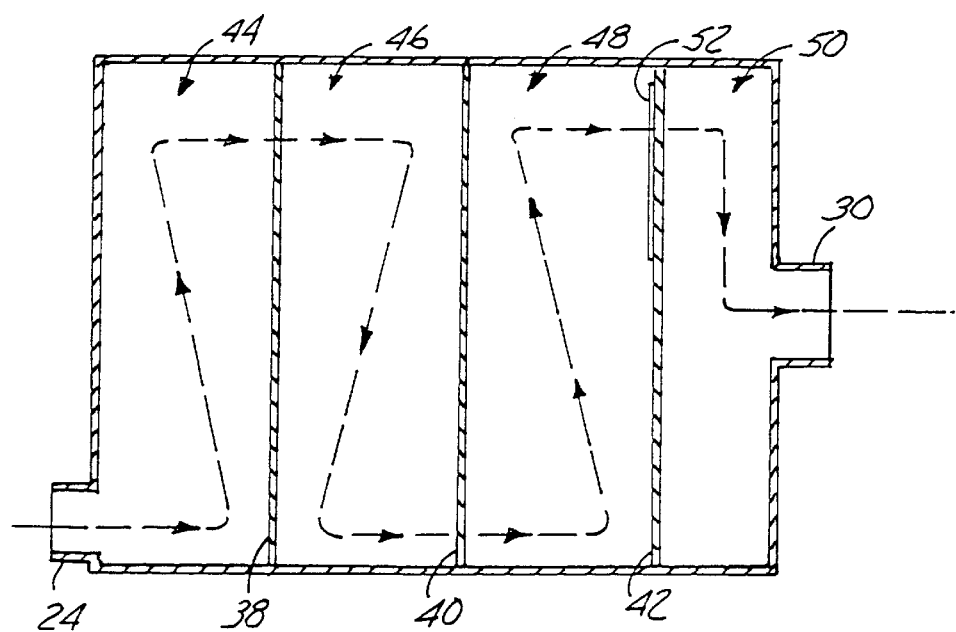
FIG. 6 is a schematic view of the mass transfer machine of the present invention, showing the liquid flow path.

During operation of the mass transfer system 10, the water from which the dissolved gases or volatile organic compounds are to be removed is supplied to the water inlet 24 located on the front surface of the body 32 of the mass transfer machine 16. The contaminated water is supplied to the water inlet 24 by the pump 14. The pump 14 is sized appropriately for the rate at which the water is to be supplied to the water inlet 24. The contaminated water then enters the body 32 of the mass transfer machine 16. FIG. 6 shows the flow path of the contaminated water through the mass transfer machine 16. As shown in FIG. 6, the water enters the first chamber 44, flows into the second chamber 46, flows into the final chamber 48, flows over the weir plate 52 into the quiescent chamber 50, and finally flows out through the water outlet 30. At this point, the drain 26 is closed to prevent water from exiting at the proximal end of the mass transfer machine 16.

As illustrated in FIG. 6, the contaminated water travels through the mass transfer machine 16 in a serpentine flow path. This serpentine flow path is generated by the placement of the openings in the baffles of the mass transfer machine 16. The first baffle 38 has an opening located at the side of the mass transfer machine 16 opposite that of the water inlet 24. The second baffle 40 has an opening at the side of the mass transfer machine 16 opposite to that of the first baffle 38. Any successive baffles will have openings at alternating opposite sides of the mass transfer machine 16. The final baffle 42 has an opening at the side opposite the opening in the previous baffle. The height of the opening in the final baffle 42 may be adjusted using the weir plate 52, thereby controlling the contaminated water depth throughout the mass transfer machine 16.

The weir plate 52 may be secured to the final baffle 42 in a variety of manners. In one embodiment, the weir plate has a series of holes running along each vertical edge, and the final baffle 42 has one hole located on each side of the window. The weir plate 52 is then fastened to the final baffle 42 by inserting a bolts through a hole in each side of the weir plate 52 and through the hole in each side of the final baffle 42. In an alternative embodiment, the weir plate 52 has a groove running along each vertical edge. Adjustment of the height of the weir plate is then made by loosening a fastener, sliding the weir plate 52 to the desired height, and tightening the fastener. In another alternative embodiment the water level is controlled by an adjustable height passage, which performs the same function as that of the weir plate 52.

While the contaminated water is flowing in a serpentine manner through the mass transfer machine 16, the air source 12 supplies air to the air inlet 22 located on the body 32 of the mass transfer machine 16 (as shown in FIG. 3). The air source 12 is typically either a fan or a blower, as will be described in greater detail below. Air provided by the air source 12 enters the mass transfer machine 16 through the air inlet 22, travels into the manifold 56 (shown in FIGS. 4A and 4B), enters the array of diffusers 58, 60, and finally exits the diffusers through the diffuser orifices 62. The diffuser orifices 62 are sized, using techniques known in the art, to create air bubble sizes appropriate for removal of dissolved gases or volatile organic compounds from the contaminated water. The diffuser orifices 62 are also generally sized large enough to prevent fouling by particles in the air. The air bubbles then enter the contaminated water and flow up and out the top surface of the water. In a first embodiment, the air is then free to exit the mass transfer machine 16 through a top surface. In a second embodiment, the cover 34 of the mass transfer machine 16 is secured to the top of the body 32 by fasteners 36, in such a manner as to form an air-tight seal. In this embodiment, the only exit path for the air is through the air outlet 28 and out the exhaust vent 18. The benefit of this embodiment is that the off-gas may be then treated on site. Whether or not the off-gas exiting through the exhaust vent 18 is treated typically depends on what type of contaminant the air has removed from the water. After operation, any water remaining in the mass transfer machine 16 may be released by opening the drain 26 located near the bottom of the mass transfer machine 16.

Because of the flow path and the storm of bubbles from the diffusers, the flow of liquid through the chambers 44, 46, 48 of the mass transfer machine 16 occurs with complete mixing in each chamber and plug flow from one chamber to the next. This flow pattern results in a sequential batch-type flow model, which helps maximize mixing of the contaminant in the liquid and maintain a high concentration gradient. Further, as opposed to tower systems known in the prior art, in the present invention, the air is delivered to the mass transfer machine 16 in parallel. In other words, each chamber 44, 46, 48 of the mass transfer machine 16 is exposed to clean, uncontaminated air, as opposed to recycling the same air from one chamber to the next. This parallel air flow helps to maximize the concentration gradient between the air and the liquid.

The mass flow rate at which dissolved gases or volatile organic compounds is transferred from the contaminated water to the air is a function of several variables, including the concentration level of contaminant in the water, the particular contaminant that is being removed, the size of the air bubbles exiting from the diffusers 58, 60 the number of air bubbles passing through the liquid, and the exposure time. The objective of the mass transfer machine 16 is to create the highest possible air to water interface, as determined by the number and surface area of the air bubbles, with the lowest possible power consumption. An advantage of the present invention, therefore, lies in its flexibility, which allows it to operate at the lowest possible power consumption for a given removal percentage.

In a first preferred embodiment, the air is provided to the mass transfer machine 16 by a fan. The fan is connected to the air inlet 22 of the mass transfer machine 16 through a throttle. This throttle, typically a blast-gate throttle, allows the air flow rate delivered to the air inlet 22 to be adjusted. In this first preferred embodiment, water is supplied to the mass transfer machine 16 by a pump 14 and travels through the mass transfer machine 16 in the serpentine fashion described above. The weir plate 52 may be adjusted up or down to control the depth of the contaminated water in the mass transfer machine 16. Increasing the depth of the contaminated water increases the residence time and thus increases the amount of contaminant removed (i.e., the amount of mass transferred). At the same time, however, increasing the depth of contaminated water increases the pressure required to move air through the system and, therefore requires more energy. During operation, as the weir plate 52 is raised to increase the depth of contaminated water in the mass transfer system 16, the throttle, located between the fan and the air inlet 22, is opened to decrease the pressure drop and increase the amount of air delivered by the fan. The present invention thereby allows an operator to minimize the power consumption of the mass transfer system 10 necessary to achieve a specified contaminant removal percentage.

In some applications, off-gas treatment is a critical part of the cleansing process. In those situations where it is necessary or desirable to treat the off-gas, it is advantageous to be able to minimize the volume of air flow used to transfer contaminant from the water to the air, because less air will then need to be treated. It is possible to achieve the same mass transfer rates with lower air flows by decreasing the size of the bubbles exiting from the diffuser. More bubbles, each bubble having a smaller diameter, increases the amount of surface area for a given air volume. In the present invention, smaller diameter air bubbles are generated by using diffusers having smaller orifices.

As explained above, in the present invention, a diffuser sleeve may be placed over the diffusers 58, 60. The diffuser sleeves 68 are made from an EPDM material having significant flexibility. This flexibility allows the sleeve and the orifices to expand and contract which has an advantage of preventing fouling of the orifices. Use of the diffuser sleeve 68, however, results in the need for an air supply under greater pressure. In this embodiment of the present invention, therefore, the air source 12 is an appropriately sized blower capable of generating the required pressure. In this embodiment, the power consumption is increased to allow the realization of the benefit of a smaller volume of off-gas requiring treatment. During operation of the present invention, when used in conjunction with a diffuser sleeve 68, air exits the diffusers 58, 60 through the diffuser orifices 62 and enters a manifold between the diffusers 58, 60 and the diffuser sleeves 68. When air pressure in this manifold reaches a sufficiently high level, the air bubbles through the sleeve orifices 72 and enters the contaminated water.

In an alternative embodiment of the present invention, the cleansing air is moved through the mass transfer machine 16 using an induced draft method. In the induced draft method, the air source 12 (typically either a fan or a blower) is connected to the air outlet 28. Operation of the fan or blower, in this configuration, generated a negative air pressure inside mass transfer machine 16 (assuming that the cover 34 has been attached to the body 32 to form an air-tight seal), which causes air to be drawn in through the air inlet 22, into the manifold 56, into the diffusers 58, 60, and through the orifices 62. This induced-draft method provides the advantage of preventing the situation where pressure accumulated inside the mass transfer machine 16, possibly leading to an explosion involving the volatile organic compound.

It is important to note that, while the above discussion relates to the transfer of diffuses gases or volatile organic compounds from a liquid to air, the present invention will operate equally as well for transferring mass from air to a liquid. Transfer of mass from air to a liquid is commonly done both to clean or scrub the air and to add a dissolved gas to the liquid (typically water). The ease at which the transfer of mass will occur in one direction or the other is a function of the solubility of the gas or volatile organic compound in water. Highly soluble substances will move more easily from air into water, while low solubility substances will move more easily from water into air. The present invention operates to move mass from air to liquid in the same manner as described above. The gas or volatile organic compound will move from the air to the water if the concentration gradient compels movement in that direction. In this mode of operation, contaminated air will be supplied to the diffusers, and clean water will be supplied to the mass transfer machine 16.

Another feature of the present invention that provides improved flexibility is the ability to add additional chambers. Adding additional chambers increases the residence time of the contaminated water in the mass transfer system 16 and increases the exposure to air bubbles from the diffusers 58, 60. These two factors increase the amount of contaminant removed from the water. Additionally, if a higher removal percentage is needed than one mass transfer system 10 is capable of providing, two or more mass transfer systems 10 may be connected in a series. A series connection of multiple mass transfer machines 16 will result increased removal percentages. Alternatively, if higher contaminated water throughput rates are needed, two or more mass transfer machines 16 may be coupled to the contaminated water source in parallel. Connection of mass transfer machines 16 in parallel allows for a higher contaminated water throughput at the same removal percentage.

A further advantage of the present invention is its low maintenance design. The presence of a cover 34 that is releasably securable to the body 32 allows for easy access and cleaning of the inside of the mass transfer machine 16. Further, the design of the mass transfer machine 16 includes no moveable parts during operation. In one embodiment of the present invention, the mass transfer machine 16 is constructed entirely from polypropylene and stainless steel. This design provides the advantage of high corrosion resistance, while maintaining stability upon exposure to dissolved gases or volatile organic compounds.

Although the present invention has been described with reference to preferred embodiments, workers skilled in the art will recognize that changes may be made in form and detail without departing from the spirit and scope of the invention.

What is claimed is:

1. A method of transferring dissolved gases or volatile organic compounds between air and a liquid, the method comprising:
    supplying liquid to a vessel wherein the liquid flows horizontally through the vessel and the vessel is comprised of a plurality of transversely disposed interconnected chambers;
    injecting air into the liquid through orifices in a plurality of diffusers;
    controlling a height of the liquid within the chambers of the vessel, wherein controlling the height of the liquid is performed by an adjustable height passage located at an exit passageway of one of the chambers; and
    controlling a flow rate and a pressure of the air injected into the liquid.

2. The method of claim 1 wherein supplying liquid to the vessel is performed by a pump.

3. The method of claim 1 wherein the liquid has a serpentine flow through the interconnected chambers of the vessel.

4. The method of claim 1 wherein baffles define the interconnected chambers, each baffle having an opening at one end to allow the liquid to flow from chamber to chamber.

5. The method of claim 1 wherein injecting air into the liquid is performed by a blower in communication with an air inlet of the vessel.

6. The method of claim 1, and further comprising placing a diffuser sleeve over at least one of the plurality of diffusers to create a manifold external to the orifices of at least one diffuser, the diffuser sleeve having a plurality of sleeve orifices of a diameter different than a diameter of the orifices of the at least one diffuser.

7. The method of claim 1, and further comprising capturing the air exiting the vessel through an exhaust vent.

8. The method of claim 7, and further comprising treating the air exiting the exhaust vent to remove hazardous components.

9. The method of claim 1 wherein injecting air into the liquid is performed by a fan in communication with an air outlet of the vessel to create a negative pressure in the vessel causing air to be drawn through an air inlet into the vessel.

10. The method of claim 1 wherein the adjustable height passage is controlled by a weir plate.

11. The method of claim 1 wherein controlling the flow rate and the pressure of the air is performed by a throttle.

12. A method of transferring dissolved gases or volatile organic compounds between air and a liquid, the method comprising:
    supplying liquid to a vessel wherein the liquid has a serpentine and substantially horizontal flow through the vessel;
    injecting air into the liquid through orifices in a plurality of diffusers;
    controlling a height of an adjustable exit passageway from the vessel to vary a height of the liquid in the vessel; and
    controlling a flow rate and a pressure of the air injected into the liquid.

13. The method of claim 12 further comprising placing a diffuser sleeve over at least one of the diffusers to create a manifold external to the orifices of the at least one diffuser, the diffuser sleeve having a plurality of sleeve orifices of a diameter different than the diameter of the orifices of the at least one diffuser.

14. The method of claim 13 wherein injecting air into the water is performed by a blower.

15. The method of claim 12, and further comprising capturing air exiting the vessel through an exhaust vent and treating the air to remove hazardous components.

16. The method of claim 12 wherein injecting air into the water is performed by using a fan located at an exit to the vessel to create a negative pressure in the vessel causing air to be drawn through an inlet to the vessel from the outside.

17. The method of claim 12 wherein controlling the flow rate and the pressure of the air is performed by a throttle.

18. The method of claim 12 wherein the vessel is comprised of a plurality of transversely disposed interconnected chambers.

19. The method of claim 18 wherein baffles define the interconnected chambers, each baffle having an opening at one end to allow the liquid to flow from chamber to chamber.

20. The method of claim 12 wherein controlling the height of the adjustable exit passageway is performed by a weir plate located in the adjustable exit passageway.

21. A method of transferring dissolved gases or volatile organic compounds between air and a liquid, the method comprising:
supplying liquid to a vessel wherein the liquid flows horizontally through the vessel and the vessel is comprised of a plurality of transversely disposed interconnected chambers;
injecting air into the liquid through orifices in a plurality of diffusers;
controlling a height of an adjustable height plate located in an opening of one of the chambers to vary a height of the liquid within the vessel; and
controlling a flow rate and a pressure of the air injected into the liquid.

22. The method of claim 21 wherein baffles define the interconnected chambers, each baffle having an opening at one end to allow the liquid to flow from chamber to chamber.

23. The method of claim 22 wherein the liquid has a serpentine flow through the interconnected chambers of the vessel.

24. The method of claim 21 wherein the adjustable height plate is a weir plate.

25. The method of claim 21, and further comprising placing a diffuser sleeve over at least one of the plurality of diffusers to create a manifold external to the orifices of at least one diffuser, the diffuser sleeve having a plurality of sleeve orifices of a diameter different than a diameter of the orifices of the at least one diffuser.

26. The method of claim 21, and further comprising capturing air exiting the vessel through an exhaust vent and treating the air to remove hazardous components.

27. The method of claim 21 wherein injecting air into the liquid is performed by a blower in communication with an air inlet of the vessel.

28. The method of claim 21 wherein injecting air into the liquid is performed by a fan in communication with an air outlet of the vessel to create a negative pressure in the vessel causing air to be drawn through an air inlet into the vessel.

29. The method of claim 21 wherein the opening of at least one of the chambers is an exit passageway from the vessel.

\* \* \* \* \*